United States

Osaki et al.

[15] 3,675,206
[45] July 4, 1972

[54] AUTOMATIC TICKET GATE

[72] Inventors: Keisuke Osaki; Hiroshi Egashira; Yasunori Hayashi, all of Kyoto, Japan

[73] Assignee: Omron Tateisi Electronics Co., Kyoto, Japan

[22] Filed: Oct. 21, 1970

[21] Appl. No.: 82,588

[30] Foreign Application Priority Data

Oct. 24, 1969 Japan..................................44/85427

[52] U.S. Cl. ...............................340/149 A, 49/35, 235/61.7
[51] Int. Cl. .....................................H04q 3/02, E05b 65/00
[58] Field of Search .......................49/35; 340/149 R, 149 A; 235/61.7; 178/6.8; 232/43.1, 43.3, 7, 61

[56] References Cited

UNITED STATES PATENTS

| | | |
|---|---|---|
| 3,221,304 | 11/1965 | Enikeieff et al....................340/149 A |
| 3,519,993 | 7/1970 | Sakai et al..........................340/149 A |
| 3,531,625 | 9/1970 | Mizuta et al. ..................340/149 A X |
| 3,560,932 | 2/1971 | Morita...............................340/149 A |

Primary Examiner—J. Karl Bell
Attorney—Christensen, Sanborn & Matthews

[57] ABSTRACT

An automatic ticket gate wherein when a ticket is used, its information is read, and depending upon whether the information is valid or not the user of the ticket is allowed or not allowed to pass through the gate. When the ticket has been recognized as invalid due to misreading of the ticket information, the information that the ticket information has been misread is recorded on the ticket and the passenger is allowed to pass through the gate despite the recognition of the ticket as invalid, and only when the information of a ticket has been misread successively more than a predetermined number of times, the user of that ticket is not allowed to pass through the gate.

4 Claims, 1 Drawing Figure

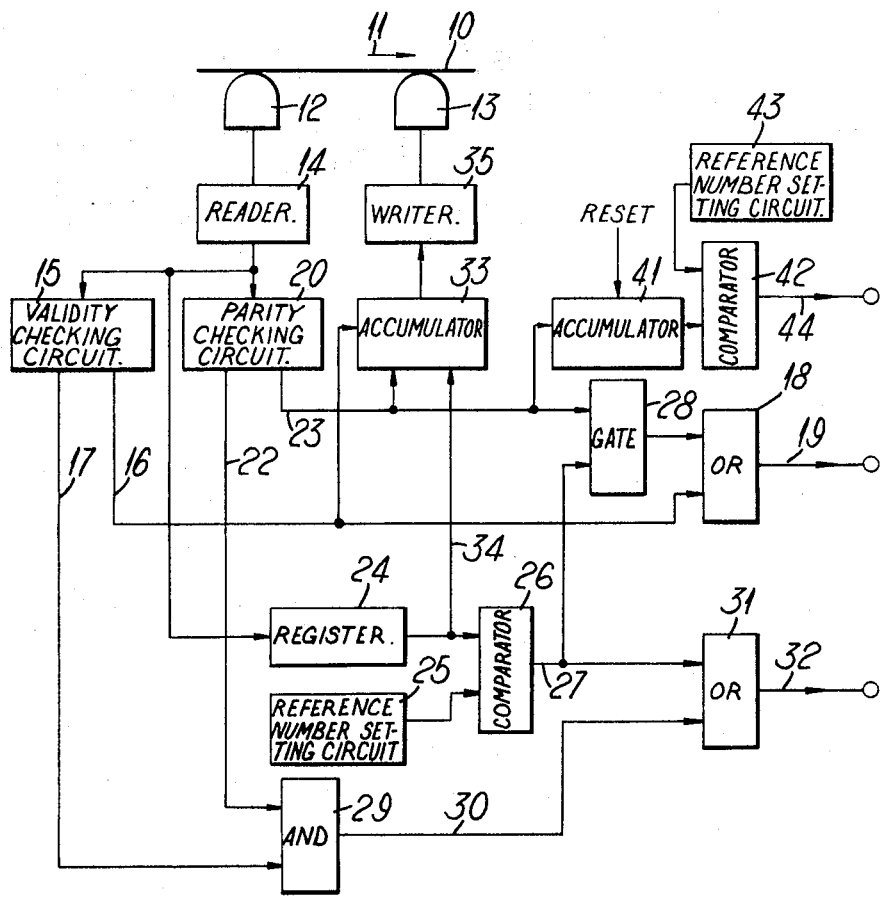

AUTOMATIC TICKET GATE

This invention relates to an automatic ticket gate and more particularly to a system for automatically examining or checking the validity of a railway ticket or the like to control the opening and closing of a gate on the basis of the result of the examination.

As is well known, a conventional automatic ticket gate is such that when a passenger presents a ticket at the gate, the validity of the ticket is checked so that if the ticket is recognized as a valid one, the passenger is allowed to pass the gate, whereas if it is recognized as an invalid one, the passenger is blocked. To check the validity of a ticket, a ticket information reader reads the information recorded on the ticket. It often happens that the ticket information reader does not properly operate so that even a valid ticket is recognized as an invalid one. There are various causes such as that the position of the information on the ticket is displaced from where it should be, or the information code is damaged or worn off; that the reading head is not disposed at a proper position relative to the ticket information to be read; and that the card reader itself is out of order. Also there are many other unknown causes. Therefore, it is not advisable to decide once and for all the validity or invalidity of a ticket upon reading the ticket information only once.

Accordingly, it is one object of the invention to provide an automatic ticket gate which operates on the basis of a fail-safe principle.

Another object of the invention is to provide an automatic ticket gate, wherein when a ticket used at the gate has been recognized as invalid due to misreading of the ticket information, the information that a misreading has occurred to the ticket is recorded thereon and the ticket is given a provisional validity so that the user of the ticket is allowed to pass the gate, and wherein when the ticket information is read, the record thereon of the information about misreading is also read and if the number of times of misreading that has occurred successively to the ticket has reached a predetermined number, the ticket is decisively recognized as invalid so that the user thereof is prevented from passing through the gate.

Another object of the invention is to provide such an automatic ticket gate as aforesaid, wherein when a ticket is recognized as valid, the record thereon of the information of misreading is removed from the ticket.

Still another object of the invention is to provide such as automatic ticket gate as aforesaid, wherein when misreading of the ticket information has occurred more than a predetermined number of times, the ticket information reader is considered as being in disorder, so that a corresponding signal is produced.

The invention will be clearly understood by reading the following description with reference to the accompanying drawing showing an electrical block diagram of a preferred embodiment of the invention.

Each card used in the system of the invention has a predetermined information magnetically recorded thereon in coded form. To check whether the ticket information has been properly read or misread, the method of parity checking is advantageously employed. Upon parity checking of the information code on a ticket, if it has been found that the code has been misread, an information to that effect, that is, the ticket information has been misread (which will be referred to as a "misreading" information) is magnetically recorded at a suitable position on the ticket. Every time a misreading has been made, one misreading information is added to the ticket. The ticket information reader reads the misreading information on the ticket as well as the ticket information, and only when the number of misreading informations, that is, the number of times the ticket information has been successively misread exceeds a predetermined number, that ticket is decisively recognized as invalid.

Even when a ticket has some misreading informations recorded thereon, if the ticket information is correctly read the next time the ticket is used, the record of the misreading informations is erased from the ticket. Thus, the adverse effect of misreading of the ticket information on the efficiency of the ticket gate can be greatly reduced and errors in the ticket information code can be easily detected.

Every time as a result of parity checking, a misreading has been detected, that fact is recorded against the ticket information reader by a suitable device, and when the number of times of misreading made by the same ticket reader has reached a predetermined number, that ticket reader is recognized as being in disorder so that a corresponding signal (disorder signal) is produced.

The system of the invention is most effectively applied to the case where the same ticket is repeatedly used, such as a commutation or season ticket. However, it may also be applied to ordinary tickets which are used only once. In this case, if a misreading occurs when a ticket is used at an entrance gate, the passenger is allowed to enter the gate. However, if a misreading again occurs with respect to the same ticket at an exit gate, the gate is closed to prevent the passenger from passing therethrough.

Now referring to the drawing, there is schematically shown a ticket 10 inserted into the inlet slot of a ticket gate the mechanical construction of which may be of any known type. The ticket 10 is conveyed by a suitable conveyor, not shown, along a predetermined path in the direction of an arrow 11. There are provided along the path of magnetic heads 12 and 13, the former for reading and the latter for writing.

The information recorded on the ticket is first detected by the reading head 12 so as to be transmitted to an information reader 14. The output from the reader 14 is applied to a validity checking circuit 15, which checks the validity of the information read from the ticket, such as the term of availability of the ticket, the range of journey made with the ticket, etc. The circuit 15 produces an output on a line 16 when the ticket has been recognized as a valid one, and on a line 17 when the ticket has been recognized as an invalid one. The signal on the line 16 is applied to an OR circuit 18, the output from which appears on a line 19. This signal on the line 19 may be used to control a gate bar or turnstile not shown so as to allow the passenger to pass through the gate.

The output from the reader 14 is also applied to a parity checking circuit 20, which checks whether any error has been made by the reader 14 in reading the information of the ticket. To this end, a parity bit, even or odd, is added to the information bits in each ticket. Upon parity checking, if the circuit 20 has determined that the information code has been correctly read, it produces an output on a line 22, while if the circuit 20 has determined that the information code has not been correctly read, it produces an output on a line 23. The determination that the code has not been correctly read means that the information code on the ticket is wrong or insufficient, or the reading head is out of order, or the relative position of the reading head to the information code on the ticket is not proper, so that a misreading has occurred.

The output from the reader 14 is also applied as an input to a register 24. This input is the "misreading" information recorded on the ticket. The misreading information contains how many times the information on the ticket has been successively misread until then and, upon recognition of each misreading, the ticket has been provisionally recognized as valid. In other words, the misreading information is recorded on each ticket as the number of times of the fail-safe operation that has until then been successively performed with respect to that ticket. Thus, the input to the register 24 is applied as a number corresponding to the number of times of the fail-safe operation. The register 24 stores the number, which is then applied as one input to a comparator 26. A reference number setting circuit 25 applies a predetermined number as another input to the comparator 26. Let it be assumed that the number stored in the register 24 is $m$ and the number preset in the circuit 25 is $n$. The comparator 26 compares the two numbers $m$ and $n$ and produces an output on a line 27 only when the number $m$ is greater than the number $n$. Therefore, when an output appears on the line 27, it indicates that misreading has occurred more than the predetermined number of times.

The output on the line 27 is applied as an inhibit signal to a gate circuit 28, to which the previously mentioned output on the line 23 is applied as an input. Therefore, while the signal exists on the line 27, the gate 28 does not produce any output, but while no signal exists on the line 27, the signal on the line 23 causes the gate 28 to produce an output to be applied to the OR circuit 18. This means that so long as the number $m$ of times of the fail-safe operation recorded on the ticket does not exceed the preset number $n$, even when the ticket information has been misread the signal on the line 23 cause the OR circuit 18 to produce an output on the line 19, which operates the gate so as to pass the passenger therethrough. However, when $m$ is greater than $n$, due to the signal on the line 27 the gate 28 and consequently the OR circuit 18 does not produce any output on the line 19.

The outputs on the lines 17 and 22 are applied as two inputs to an AND circuit 29. As previously mentioned, when the ticket information read is invalid, the validity checking circuit 15 produces an output on the line 17, and when no error has been made in reading the ticket information, the circuit 20 produces an output on the line 22. Then, the AND circuit 29 produces an output on a line 30. This signal is applied to an OR circuit 31, which produces an output on a line 32. This signal is used to close the gate or keep it closed to prevent the passenger from passing it.

As previously mentioned, when the number $m$ stored in the register 24 is greater than the preset number $n$, the comparator 26 produces an output on the line 27. This signal is also applied to the OR circuit 31, so that the passenger is prevented from passing through the gate.

The signals on the lines 23 and 34 are applied to an accumulator 33, to which the signal on the line 16 is applied as a reset input. As previously mentioned, the signal on the line 34 is the number $m$ of times of the fail-safe operation performed with the ticket until then and stored in the register 24, and the signal on the line 23 is the signal which is produced when parity checking has disclosed that the ticket information has been misread. In other words, this latter signal means that another fail-safe operation is to be performed with respect to that ticket and corresponds to the number of 1. The accumulator 33 adds the two numbers $m$ and 1 and produces an output corresponding to $m + 1$ to be applied to a writer 35, so that the writing head 13 erases the number $m$ recorded on the ticket until then and instead writes the number of $m + 1$ thereon.

However, when the information read has been recognized as valid, without any error or misreading having been made, the signal on the line 16 resets the accumulator 33 so that the writing head 15 rewrites the number $m$ on the ticket as 0. In this case, those errors or misreadings that have been made till then may be considered as having been caused by some disorder of the reading device, and the ticket information, as having been actually valid, so that the record on the ticket of the misreading or fail-safe information may be erased therefrom without causing any inconvenience.

The output produced on the line 23 is also applied to an accumulator 41, which accumulates the signals received every time a misreading has occurred. The output from the accumulator 41, that is, the number of times misreading has occurred is applied as one input to a comparator 42, to which a reference number setting circuit 43 applies a predetermined number as the other input. The comparator 42 compares the two input numbers and produces an output on a line 44 when the former number exceeds the latter, that is, when misreading or fail-safe operation has been performed more than a predetermined number of times. This condition is considered as indicating that the ticket reader is out of order and the signal on the line 44 is used as a disorder signal to give a suitable warning or indication. The accumulator 41 is reset by a reset signal applied through a line manually or automatically upon passage of each predetermined period of time.

In the above description, the ticket information is given in the form of magnetic code. It may be given in the form of punched holes. In this case, a photoelectric device is used to read the ticket information. However, in view of the easiness of reading and writing, it is more convenient to record the number of times of misreading or fail-safe operation on the ticket by means of magnetic code. With respect to parity checking any known method may be employed.

If the ticket is an ordinary one which is used first at an entrance gate and later at an exit gate alone, the reference number $n$ of times of fail-safe operation set in the circuit 25 is 1 and the number of $m$ stored in the register 24 never exceeds 1. Therefore, in this case the arrangement may be such that the comparator 26 produces an output on the line 27 when $m = n$.

Thus, in accordance with the invention, so long as the number of times the information of a ticket repeatedly used has been successively misread does not exceed a predetermined number, the passenger with that ticket is allowed to pass the gate. However, when the number of times of misreading successively made on the same ticket exceeds the predetermined number, the passenger is no longer allowed to pass the gate. This makes it possible not only to avoid confusion at the gate caused by mere misreading of the ticket information but also to detect invalid tickets after permitting use of that ticket only a few times. When the ticket information has been correctly read again even after it was once misread, the record of the misreading or fail-safe operation that has been made until then is removed from the ticket, thereby restoring the ticket to the original proper condition without causing any inconvenience to the owner. In addition, it is possible with the system of the invention to detect disorders of the ticket information reading device.

What we claim is:

1. An automatic ticket gate, comprising: means for reading the information of each ticket used at the gate; means for checking the validity of said information read by said reading means; means operable in response to said checking means to control passage through said gate; means for detecting misreading of said ticket information made by said reading means; means for accumulating the number of times of the misreading successively made on said same ticket; means for recording said accumulated number of times on said ticket; and means for reading said recorded number of times from each said ticket and causing said passage control means to allow passage through said gate unless said recorded number exceeds a predetermined number.

2. The system of claim 1, wherein said recording means removes from said ticket said recorded number of times of misreading when said ticket information has been correctly read again.

3. The system of claim 1, wherein said ticket has recorded thereon a plurality of information bits and a parity bit and said misreading detecting means performs parity checking on said bits.

4. The system of claim 1, further including means for storing the number of times of misreading made by said reading means and means for producing a signal indicating that said reading means is in disorder when said number has reached a predetermined number.

* * * * *